(12) United States Patent
Raillon et al.

(10) Patent No.: US 6,901,029 B2
(45) Date of Patent: May 31, 2005

(54) TOWED LOW-FREQUENCY UNDERWATER DETECTION SYSTEM

(75) Inventors: Louis Raillon, Cagnes sur Mer (FR); Jean-Jacques Fyot, Paris (FR); Régis Quer, Guilherand (FR); Christine Debaillon-Vesque, Roquefort les Pins (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 10/471,541

(22) PCT Filed: Mar. 29, 2002

(86) PCT No.: PCT/FR02/01108

§ 371 (c)(1),
(2), (4) Date: Sep. 11, 2003

(87) PCT Pub. No.: WO02/079806

PCT Pub. Date: Oct. 10, 2002

(65) Prior Publication Data

US 2004/0125701 A1 Jul. 1, 2004

(30) Foreign Application Priority Data

Mar. 30, 2001 (FR) .......................................... 01 04378
Aug. 24, 2001 (FR) .......................................... 01 11105

(51) Int. Cl.$^7$ ................................................. G01V 1/04
(52) U.S. Cl. ................................................... 367/106
(58) Field of Search ................................ 367/106, 130, 367/154

(56) References Cited

U.S. PATENT DOCUMENTS

| | | | |
|---|---|---|---|
| 5,058,082 A | * 10/1991 | Bertheas et al. | ............ 367/130 |
| 5,216,805 A | 6/1993 | Hallenbeck et al. | |
| 5,783,815 A | 7/1998 | Ikeda | |
| 6,117,193 A | 9/2000 | Glenn | |

FOREIGN PATENT DOCUMENTS

| | | | | |
|---|---|---|---|---|
| EP | 0 400 176 A | 12/1990 | | |
| EP | 0 585 186 A | 3/1994 | | |
| WO | WO 02/079806 | * 10/2002 | ............ | G01V/1/04 |

OTHER PUBLICATIONS

Paten Abstract of Japan vol. 1999, No. 12, Oct. 29, 1999 & JP 11 191865 A Jul. 13, 1999.

Paten Abstract of Japan vol. 2000, No 02, Feb. 29, 2000 & JP 11 317895 A, Nov. 16, 1999.

* cited by examiner

*Primary Examiner*—Daniel Pihulic
(74) *Attorney, Agent, or Firm*—Lowe Hauptman Gilman & Berner, LLP

(57) ABSTRACT

The invention relates to low-frequency underwater detection systems comprising a towed linear antenna (12, 13).

Figure 1:
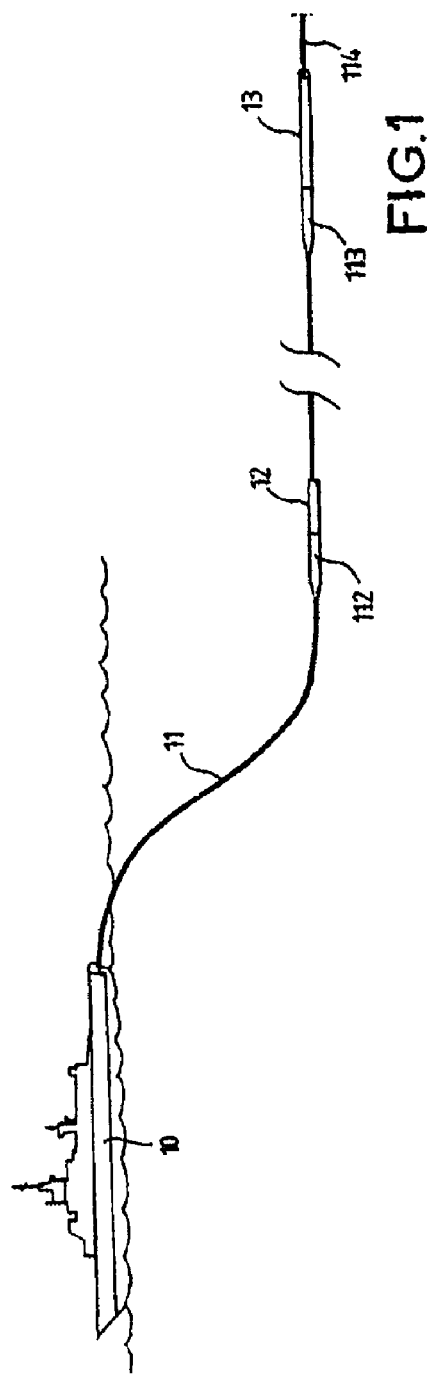

It consists in producing the transducers of the transmission antenna (12) in the form of flextensional arrays of cylindrical type (20) and in forming directional transmission channels covering all of space.

It makes it possible to lighten the assembly and to facilitate implementation at sea, which becomes able to be automated.

8 Claims, 4 Drawing Sheets

TOWED LOW-FREQUENCY UNDERWATER DETECTION SYSTEM

The present invention concerns underwater detection systems which use at least one linear reception antenna towed by a surface vessel or by a submarine. More particularly, it relates to systems for activating linear antennas that are towed from a surface vessel and that can be wound up on winches.

In the known systems, the surface vessel tows a fish which comprises the acoustic transmitter composed of several low-frequency transducers and to which the linear reception antenna is hooked up. The description of such a system will be found for example in French Patent No. 95 07228 filed on Jun. 16, 1995 by the company Thomson-CSF, published on Oct. 31, 1996 under No. 2 735 645 and granted on Jul. 30, 1997. These systems demand considerable means as far as placement in the water and recovery on board the boat are concerned. As regards hardware means, the boat must have at least one crane associated with a winch, and in terms of human means, experience shows that at least 3 people are required in order to perform the maneuvers under conditions of safety which nevertheless remain mediocre, or even poor in heavy seas.

In order to fix matters, a fish such as that described in the aforesaid patent weighs about 2 tonnes in air. Thus, in particular during recovery, it is necessary to raise the fish after winding up the heavy cable on a winch with the linear antenna hooked behind, and then to disconnect the antenna and wind it up on a second winch.

According to the prior art, for example described in French Patent No. 94 15109 filed on Dec. 15, 1994 by the Délégation Générale à l'Armement and published on Jun. 21, 1996 under No. 2 728 425, the acoustic transmitter is formed of a linear antenna comprising electroacoustic transducers of Tonpilz type with 2 horns. According to an embodiment described on page 19 and FIG. 6, the transmission antenna is followed by one or more linear reception antennas, one at least having ambiguity removal. Even though this system resolves the handling problem mentioned previously and makes it possible to obtain a lighter anti-submarine warfare system than the known systems, it has the drawback of being directional in transmission, this being quite in accordance with the aim of the invention described in this patent, which is to go from a known volumic transmission system to a linear system that is very directional in a horizontal plane. Hence, the use of transducers of Tonpilz type whose emissive faces are situated on the axis of the antenna does not allow the formation of channels in directions inclined with respect to this axis. This stems from the acoustic interactions between the transducers that mutually insonify one another. Moreover the diameter of the antenna is large, of the order of 20 cm, this posing enormous problems with regard to winding it up on a winch.

Under these conditions, the operational benefit of this device is much reduced.

To alleviate these drawbacks, the invention proposes the use of a linear transmission antenna composed of flextensional transducers of cylindrical type and combined with a system for forming channels on transmission covering all of space.

According to another characteristic of the invention, 3 distinct modes of transmission are used, one directional, the other sectorial, and the third of the known RDT type.

According to another characteristic of the invention, the RDT transmission mode is a double-beam mode.

According to another characteristic of the invention, a reception antenna comprising trios of hydrophones integrated in a rigid manner into a single linear antenna is associated with the transmission antenna.

Finally, according to another characteristic of the invention, the diameters of the transmission and reception antennas are equal.

Figure 2:
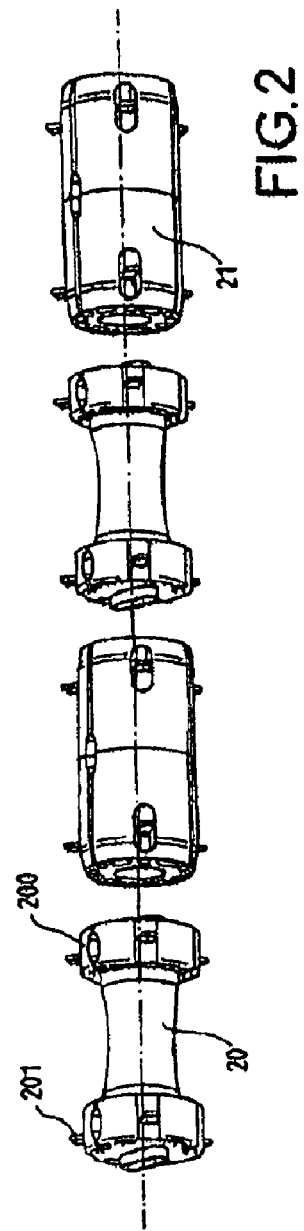
Figure 3:
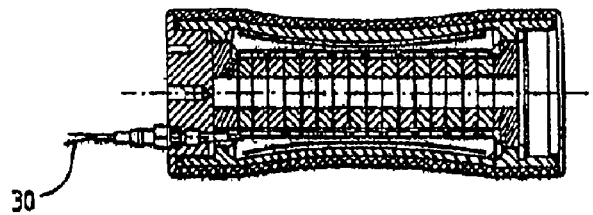
Figure 4:
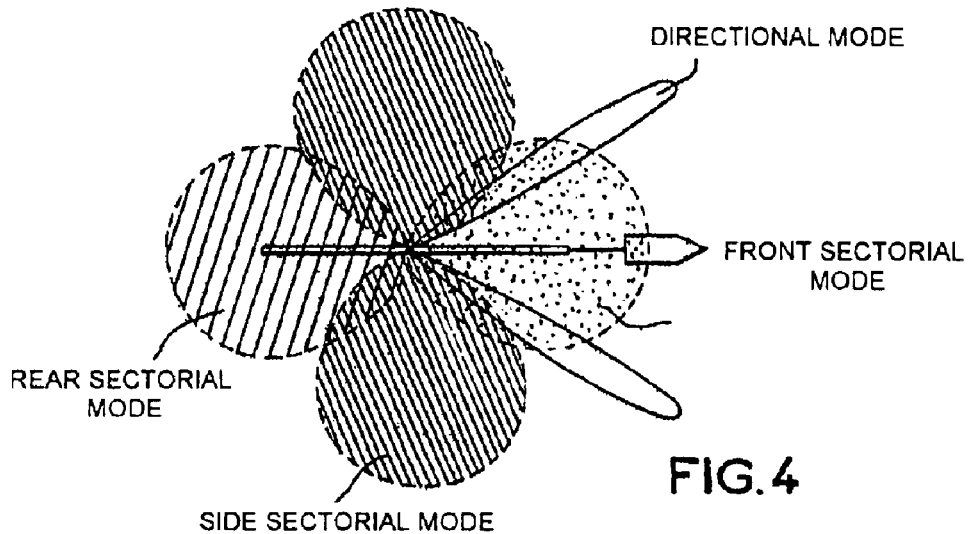
Figure 5:
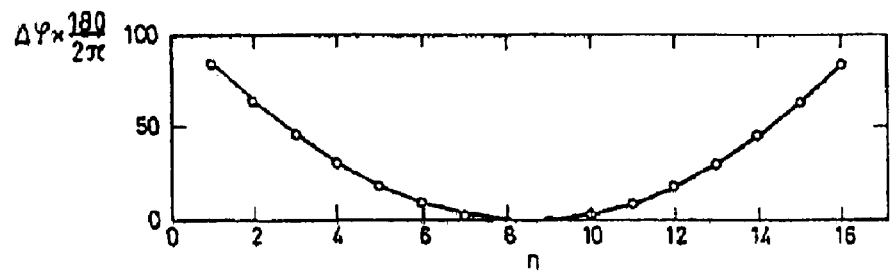
Figure 6:
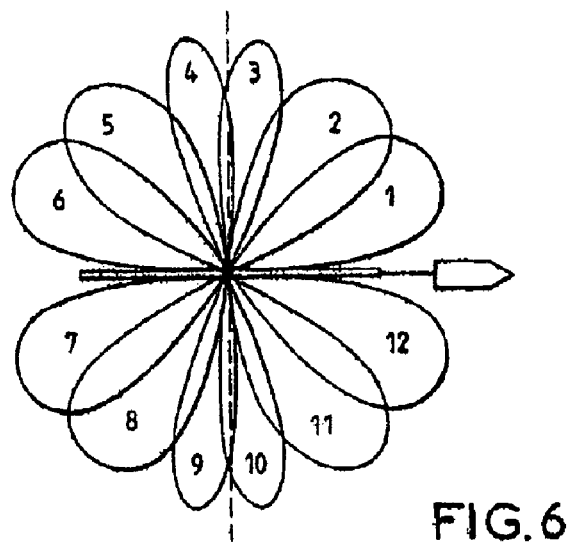
Figure 7:
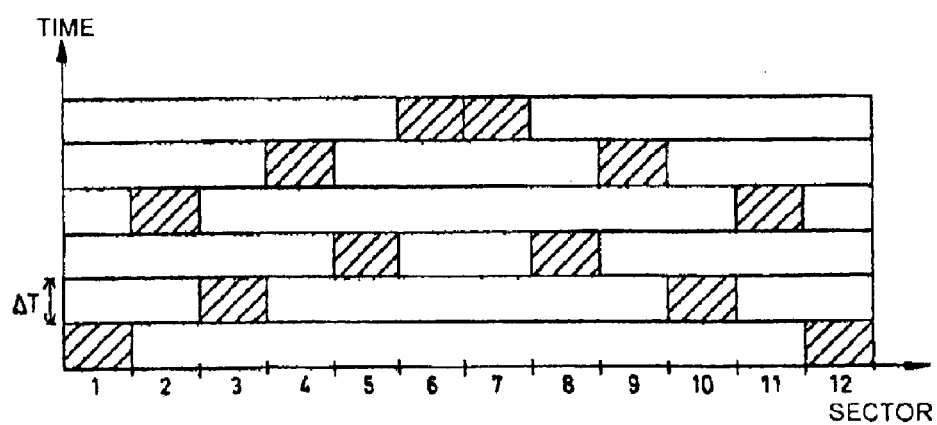
Figure 8:
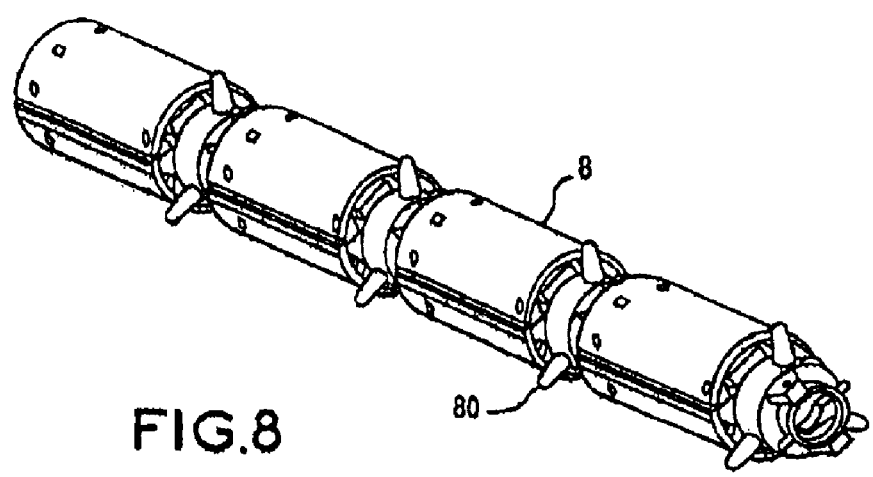
Figure 9:
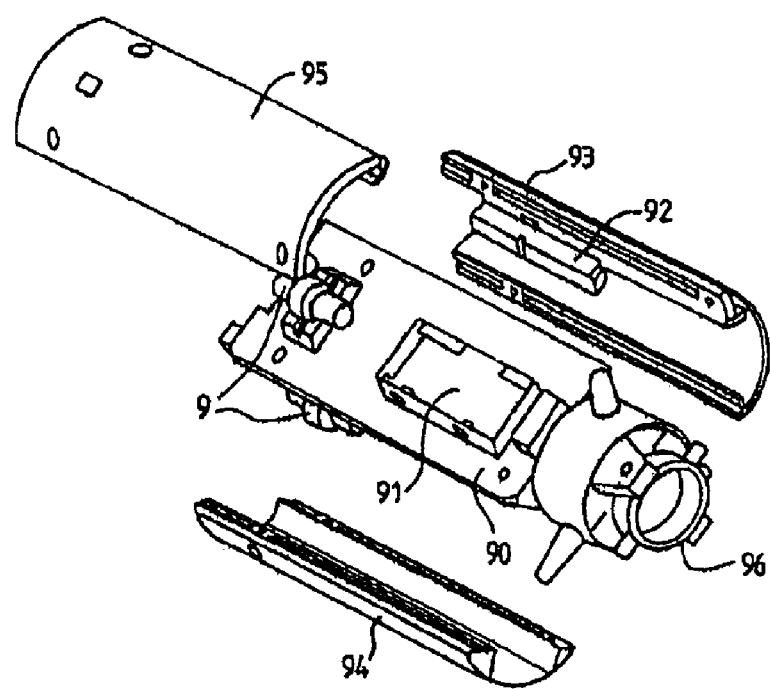

Other features and advantages will become clearly apparent in the following description, given by way of non-limiting example with regard to the appended figures which represent:

FIG. 1, a diagrammatic view of the entire system;

FIG. 2, a perspective view of two transmission assemblies;

FIG. 3, a sectional view of a transducer 20 of FIG. 2;

FIG. 4, a picture of the directional and sectorial transmission modes;

FIG. 5, a phase correction law for the transmission signals;

FIG. 6, a picture of the RDT transmission mode;

FIG. 7, a chart of the transmission times in this RDT mode;

FIG. 8, a perspective view of an assembly of assembled reception modules; and FIG. 9, an exploded perspective view one of these modules.

In FIG. 1 which represents a diagram of the entire system, a surface vessel 10 tows a transmission antenna 12 and a reception antenna 13 by way of a heavy cable 11. In a known manner, damping modules 112 and 113 reduce the vibrations caused by the towing as well as by a tail cable 114.

Represented in FIG. 2 is an exemplary embodiment of two transmission assemblies which will constitute a transmission antenna after they have been sheathed. Each assembly is formed of a flextensional transducer 20 and of a cylindrical container 21 making it possible to adjust the buoyancy of the assembly. The transducer is of the split monocoque flextensional type as described for example in French Patent No. 95 10534 filed on Sep. 8, 1995 by the Applicant, published on Jan. 20, 1997 under No. 2 738 704 and granted on Oct. 7, 1997. Rings 200 furnished with three 120° lugs 201 allow the holding and the centering of the transducers in the sheath. At the head of the antenna, a module (not represented) contains the electrical transformers making it possible to step up the voltage and to tune them to the transmission frequency. They are linked to the two control wires 30 of the piezoelectric motors of the transducers represented as a longitudinal section in FIG. 3.

Each transducer being essentially capacitive of value C, tuning is carried out on the basis of the inductance L of the transformer by applying the formula $$\omega = \frac{1}{\sqrt{LC}},$$

ω being the angular frequency corresponding to the transmission frequency.

This module receives the signals from the surface vessel by way of the electric suspension cable 11.

According to the invention, channels are formed on transmission in all of space by using in a known manner signals obtained from a digital processing assembly situated on board the boat.

Three modes of transmission are used for this purpose:
a mode known by the name RDT standing for "Rotary Directional Transmitter", over 360°,
a sectorial mode,
a directional mode.

With each mode of transmission is associated a digital channel forming by delay, also known in the art as "Inverse Beam Forming".

In conventional manner, the transmissions are formed of CW or hyperbolic FM pulses, or a combination of the two, or else BPSK (Binary Phase Shifting Key) over variable durations. To form a channel, the signals generated from frequency synthesizers and digitized are delayed with a specified delay value for each flextensional transducer, then amplified so as to be sent to the transmission antenna.

FIG. 4 diagrammatically represents the radiation patterns obtained in directional mode and sectorial mode. In directional mode, the beam is as narrow as possible given the resolution of the antenna and to each pulse transmitted there corresponds a different direction.

It is recalled that for a linear antenna, the radiation pattern exhibits a volume with symmetry of revolution about the axis of the antenna except for the 2 right/left directions on the axis of the antenna, referred to as "end-fire". It is also recalled that the lobe widths are variable, from the narrowest on the side perpendicularly to the axis of the antenna, referred to as "broad-side", to the widest "end-fire".

The channel formings are conventionally obtained by delays or phase shifts introduced onto the signal from each flextensional transducer, this signal being provided by frequency synthesizers depending on the type of pulse transmitted. The delays are computed digitally on the basis of commercial electronic cards.

In a known manner, the sectorial mode is obtained by widening the main lobe of the transmission beam by programming a delay or phase law adapted to the signals from the transducers, for example a law of quadratic type.

According to an exemplary embodiment, the transmission antenna comprises 16 transducers and the phase correction law $$\Delta\varphi \times \frac{180}{2\pi}$$

applied is represented in FIG. 5, making it possible to obtain directivity lobes with steep flanks so as to separate them better.

According to a characteristic of the invention, an RDT mode is applied to the transmission antenna to obtain omnidirectional transmission on the basis of a long pulse. FIG. 6 represents the radiation pattern obtained according to sectors numbered from 1 to 12. The pulse transmitted is divided into 6 juxtaposed slices of duration ΔT. As represented in FIG. 7, each pulse slice provides a transmission along 2 sectors. Each slice ΔT can correspond to a CW or wideband coded pulse, or both.

According to the invention, the reception antenna comprises a device with hydrophone trios which is integrated in a rigid manner into a single linear antenna. Right/left channel forming is then performed as described for example in French Patent No. 89 11749 filed on Sep. 8, 1989 by the company Thomson-CSF, published on Mar. 15, 1991 under No. 2 651 950 and granted on Apr. 17, 1992. Thus the ambiguity removal is then carried out with a single transmitted pulse. According to an exemplary embodiment, right/left discrimination is obtained in the 30°–150° and 210°–330° bearing sectors.

FIGS. 8 and 9 respectively represent an assembly of modules of the reception antenna before sheathing, and such a reception module in an exploded view.

Each module contains 3 acceleration-insensitive hydrophones 9 positioned at the vertices of an equilateral triangle in a plane perpendicular to the axis of the antenna (the third is hidden in the figure). These hydrophones are supported by a plate 90 in which is made a housing 91 for installing a small cylindrical container containing the reception electronics. The plate is held in place by means of shoulders 92 made on two parts 93 and 94 forming the module together with a third part 95. An annular piece 96 furnished with lugs ensures mutual torsionless holding of the modules. The assembly is held in the sheath by the centering pieces 80. A compact reception antenna with ambiguity removal is thus obtained making it possible to obtain directivity in the vertical plane.

According to an exemplary embodiment, the transmission and reception antennas have a diameter equal to around 85 mm, the frequency band being situated around 1.5 Hertz, and the reception antenna is composed of 128 modules, i.e. 3×128 reception channels, and directivity is obtained in the vertical plane lying between 110° and 120°.

What is claimed:

1. A towed low-frequency underwater detection system comprising:

in series on one and the same towline a linear transmission antenna followed by a linear reception antenna with ambiguity removal wherein the transmission antenna being in a substantially horizontal plane comprises a plurality of flextensional transducers, each transducer being housed in a cylindrical shell; and means for powering these transducers in such a way as to form transmission beams covering the whole space, the linear transmission and the linear reception antennas having a substantially the same diameter.

2. The system as claimed in claim 1, of which the linear reception antenna is formed of reception modules, wherein each of these modules comprises 3 hydrophones in a plane perpendicular to the axis of the antenna.

3. The system as claimed in claim 1, wherein 3 distinct modes of transmission are used, one directional mode, a sectorial mode and a Rotational Directional Transmission (RDT) mode.

4. The system as claimed in claim 3, wherein the RDT mode is a double-beam mode.

5. The system as claimed in claim 2, wherein 3 distinct modes of transmission are used, a directional mode a sectorial mode and a RDT mode.

6. The system as claimed in claim 5, wherein the RDT mode is a double-beam mode.

7. The system as claimed in claim 4, wherein a RDT transmission mode is used, an omni directional or selected wide sectorial transmission being obtained by means of successive wide and steep flank beams forming a long pulse.

8. The system as claimed in claim 7 wherein, in RDT mode, an omni directional transmission is obtained by means of the said successive wide and step flank beams, the number of said successive beams being less than the number of the transducers of the transmission antenna.

* * * * *